United States Patent [19]

Bichler

[11] Patent Number: 5,306,975
[45] Date of Patent: Apr. 26, 1994

[54] VIBRATION INSULATION OF A BODY ON MAGNETIC BEARINGS

[75] Inventor: Udo W. Bichler, Heidelberg, Fed. Rep. of Germany

[73] Assignee: Ant Nachrichtentechnik GmbH, Heidelberg, Fed. Rep. of Germany

[21] Appl. No.: 946,422

[22] PCT Filed: May 4, 1991

[86] PCT No.: PCT/EP91/00848
§ 371 Date: Nov. 6, 1992
§ 102(e) Date: Nov. 6, 1992

[87] PCT Pub. No.: WO91/17368
PCT Pub. Date: Nov. 14, 1991

[30] Foreign Application Priority Data
May 8, 1990 [DE] Fed. Rep. of Germany ....... 4014716

[51] Int. Cl.⁵ ............................................... H02K 7/09
[52] U.S. Cl. .................................... 310/90.5; 318/611
[58] Field of Search ............... 310/90.5; 318/611, 612, 318/614, 620, 623, 646, 665

[56] References Cited
U.S. PATENT DOCUMENTS

| 4,128,795 | 12/1978 | Habermann et al. | 318/618 |
|---|---|---|---|
| 4,629,262 | 12/1986 | Hamilton | 310/90.5 |
| 4,691,152 | 9/1987 | Ell et al. | 318/616 |
| 4,697,128 | 9/1987 | Matsushita et al. | 310/90.5 |
| 4,839,550 | 6/1989 | Mizuno et al. | 310/90.5 |
| 4,841,184 | 6/1989 | Chen et al. | 310/90.5 |

FOREIGN PATENT DOCUMENTS

| 0157693 | of 0000 | European Pat. Off. | 310/90.5 |
|---|---|---|---|
| 413030A1 | of 0000 | European Pat. Off. | 310/90.5 |
| 2658668 | of 0000 | Fed. Rep. of Germany | 310/90.5 |
| 3819205 | of 0000 | Fed. Rep. of Germany | 310/90.5 |
| 3923997 | of 0000 | Fed. Rep. of Germany | 310/90.5 |
| 8300166 | of 0000 | PCT Int'l Appl. | 310/90.5 |
| 2129582 | of 0000 | United Kingdom | 310/90.5 |

OTHER PUBLICATIONS

Ip-Abstract 1-83915, In: M-845, vol. 13, No. 289; Jul. 5, 1989.
Ip-Abstract 63-235715, In: M-787, vol. 13, No. 25, Jan. 2, 1989.

Primary Examiner—Steven L. Stephan
Assistant Examiner—Matthew Nguyen
Attorney, Agent, or Firm—Spensley Horn Jubas & Lubitz

[57] ABSTRACT

A device for insulating a body on magnetic bearings from vibration of its stator and hence the environment and vice versa. The body may include a rotor which can produce undesirable vibrations during rotation. The position of the body is caused to follow slow movements of the stator, but does not follow higher frequency interference. However, intentional fast position regulating procedures are possible. The device includes a double integrator which generates a largely interference-free position sensor signal for low vibration bearing adjustment which is followed slowly by a true position sensor signal. The device can be used in a flywheel for satellite stabilization where it facilitates adjustment of the angular position while at the same time providing insulation against vibration.

16 Claims, 4 Drawing Sheets

VIBRATION INSULATION OF A BODY ON MAGNETIC BEARINGS

The present invention relates to a device for weakening interference forces created during seating of a body on magnetic bearings, the body being movable along at least one translational axis, which device includes a magnetic position control circuit connected between a sensor which provides a signal representing the position of the body relative to the bearings and a control unit having an input and an output for providing a signal to adjust the position of the body relative to the bearings, the control circuit having a unit defining two integrators.

The body on magnetic bearings can in particular be a rotor which generates interfering vibrations by its rotation, which are intended to be kept away from the stator. It can also pertain to a sensitive system, which is intended to be on bearings insulated from a vibrating environment.

A device for compensating synchronous interfering influences, stemming in particular from imbalanced masses, in a rotor on magnetic bearings having at least one radial magnetic bearing provided with coils, is known from German Patent Publication DE 26 58 668 A1. The bearing of the rotor has at least one sensing device for detecting the radial position of the rotor and a regulating circuit connected with the sensing device and the coils, which has a control circuit for supplying the coils. Signals from the sensing device are provided to the control circuit for regulating the position of the rotor in a predetermined radial position. The regulating circuit has a filter device between the sensing device and the control circuit, which constitutes a rejection filter on at least one frequency corresponding to the rotational speed of the rotor for the signals generated by the sensing device.

Furthermore, a magnetic bearing with a device for suppressing imbalance movements of the rotor is known from U.S. Pat. No. 4,841,184. The magnetic bearing contains coils which, together with a sensor device for measuring the rotor position and a control circuit connected therewith, are used for the generation of forces controlling the rotor position. The control device contains integrators for reconstructing signals corresponding to speed and acceleration from the position of the rotor. These signals are used as an additional feedback for the control.

Object

The object of the invention is to provide a device by means of which the vibrations acting on the body on magnetic bearings from the outside or acting on its surroundings and coming from the magnetic body can be suppressed.

The above and other objects are achieved, according to the present invention, in a device for weakening interference forces created during seating of a body on magnetic bearings, the body being movable along at least one translational axis, which device includes a magnetic position control circuit connected between a sensor which provides a signal representing the position of the body relative to the bearings and a control unit having an input and an output for providing a signal to adjust the position of the body relative to the bearings, the control circuit having means defining two integrators, by the improvement wherein:

the means defining two integrators comprise a first integrator and a second integrator each having a signal input and a signal output, the signal output of the first integrator being connected to the signal input of the second integrator so that the first and second integrators constitute a double integration unit, the signal input of the first integrator is connected to receive a signal having a value at least approximately proportional to a force capable of stabilizing the body relative to the bearings along at least one translational axis, and the double integration unit is operative for providing an output signal constituting an actual position value control signal from the control circuit; and the control circuit further comprises means including a low frequency bandpass filter and attenuation members for applying to the inputs of both of the integrators a signal having a value which is a function of the difference in value between the output signal provided by the double integration unit and the signal provided by the sensor.

Objects according to the invention are also achieved, in a device for weakening interference forces created during seating of a body on magnetic bearings, which body is rotatable on the bearings about an axis of rotation, is capable of tilting about two tilting axes which are perpendicular to the axis of rotation and can be stabilized about one of the tilting axes by a torque, the device including a magnetic position control circuit connected between a sensor which provides a signal representing the position of the body relative to the bearings and a control unit having an input and an output for providing a signal to adjust the position of the body relative to the bearings, the control circuit having means defining two integrators, by the improvement wherein:

the means defining two integrators comprise a first integrator and a second integrator each having a signal input and a signal output, the signal output of the first integrator is connected to the signal output of the second integrator so that the first and second integrators constitute a double integration unit, the signal input of the first integrator is connected to receive a signal having a value at least proportional to the torque which can stabilize the body about the one tilting axis, and the double integration unit is operative for providing an output signal constituting an actual position value control signal from the control circuit; and the control circuit further comprises means including a low frequency bandpass filter and attenuation members for applying to the inputs of both of the integrators a signal having a value which is a function of the difference in value between the output signal provided by the double integration unit and the signal provided by said sensor.

Advantageous further features and embodiments of the invention will be described below.

The proposed device assures that the set position of the body on bearings follows the slow movements of the stator, but that interferences of higher frequency are not transmitted. In particular, rapid position control operations continue to be possible, so that such a body can be used as an adjustment element for a satellite bearing control.

In this device a signal, which is proportional to the force which stabilizes the body on magnetic bearings in one of the translational axes or in one of the two tilting shafts which are perpendicular to the axis of rotation, or to the torque, is transmitted to a dual integration device which is realized either electronically or in a digital computer. The respective output signal is used as the actual value for the position control, instead of the actual position signal of the body. The difference between the output signal of the dual integration device and the position signal is supplied to a low bandpass filter, the output signal of which is transmitted via suitable attenuation members to the inputs of the two integrators in order to compensate for drift effects.

DESCRIPTION OF THE DRAWINGS

The invention will be described in detail by means of the attached drawings.

Shown are in.

Figure 1:
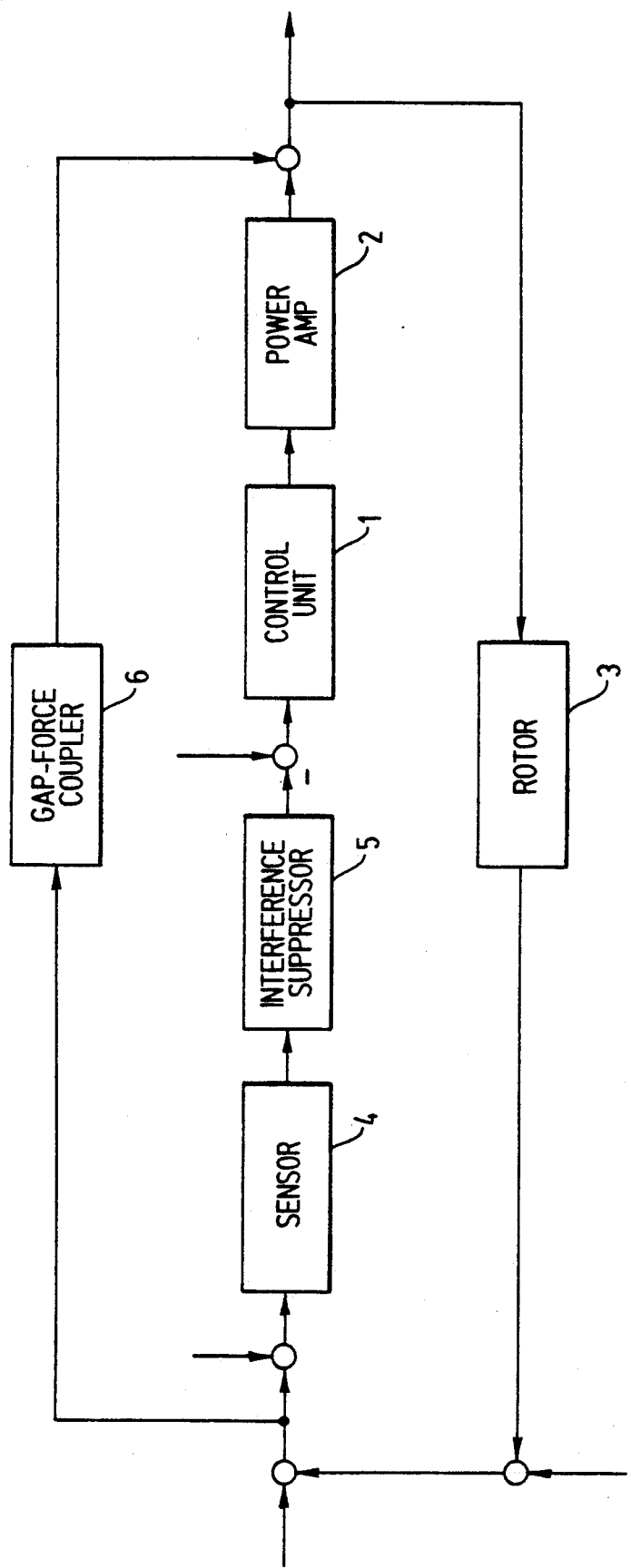
FIG. 1, the principle of vibration insulation.

The principle of a translational magnetic bearing control circuit for a rotating body 3 is shown in FIG. 1. Since in this case the interfering force is the value of interest which is to be affected, the force is shown at the output of the circuit. Besides the set bearing value, the inputs are particularly the interferences which cause the interference forces in the end.

The control unit 1 receives the difference between the set value and the position sensor signal and from this forms an adjusting signal, which is converted into current and thus force by the power amplifier 2. The force moves the rotor 3, a change of the position of the center of gravity of the rotor is created. This is the value which actually is intended to be measured. However, first a displacement of the stator caused by external forces is superimposed on the displacement of the center of gravity. In addition, there is a centrifugal movement caused by the unavoidable remaining imbalances, which are naturally detected by the sensor 4. In addition, the sensor 4 includes measurements of surface irregularities of the measuring surfaces of the rotor 3. Finally, every measuring method produces electronic interferences. In accordance with the invention, all these interferences in the sensor signal are now eliminated to a large extent in a special block, interference suppression 5, before they are converted into force via the control unit 1 and power amplifier 2. The interference suppression (=vibration insulation) must be performed in such a way that the operation of the bearing control is not impaired by it.

Interference forces can also be generated in another way, as indicated in FIG. 1 by means of the block gap-force coupling 6. Most magnetic bearings are based on the electromagnetic force generation principle, possibly assisted by a stationary permanent magnet flux. These principles directly convert changes in the magnetic gap in flux changes, and thus force changes. Therefore, imbalanced movements of the rotor and movements of the stator directly generate corresponding forces, without it being possible to prevent this by interference suppression.

The invention proposes novel technical control devices for the bearing control circuits as solution of the problem of vibration, where the blocks interference suppression 5 and control unit 1 in FIG. 1 are novel. A force generating principle is also proposed in connection therewith, which does not present coupling with the force because of a changing gap.

Figure 2:
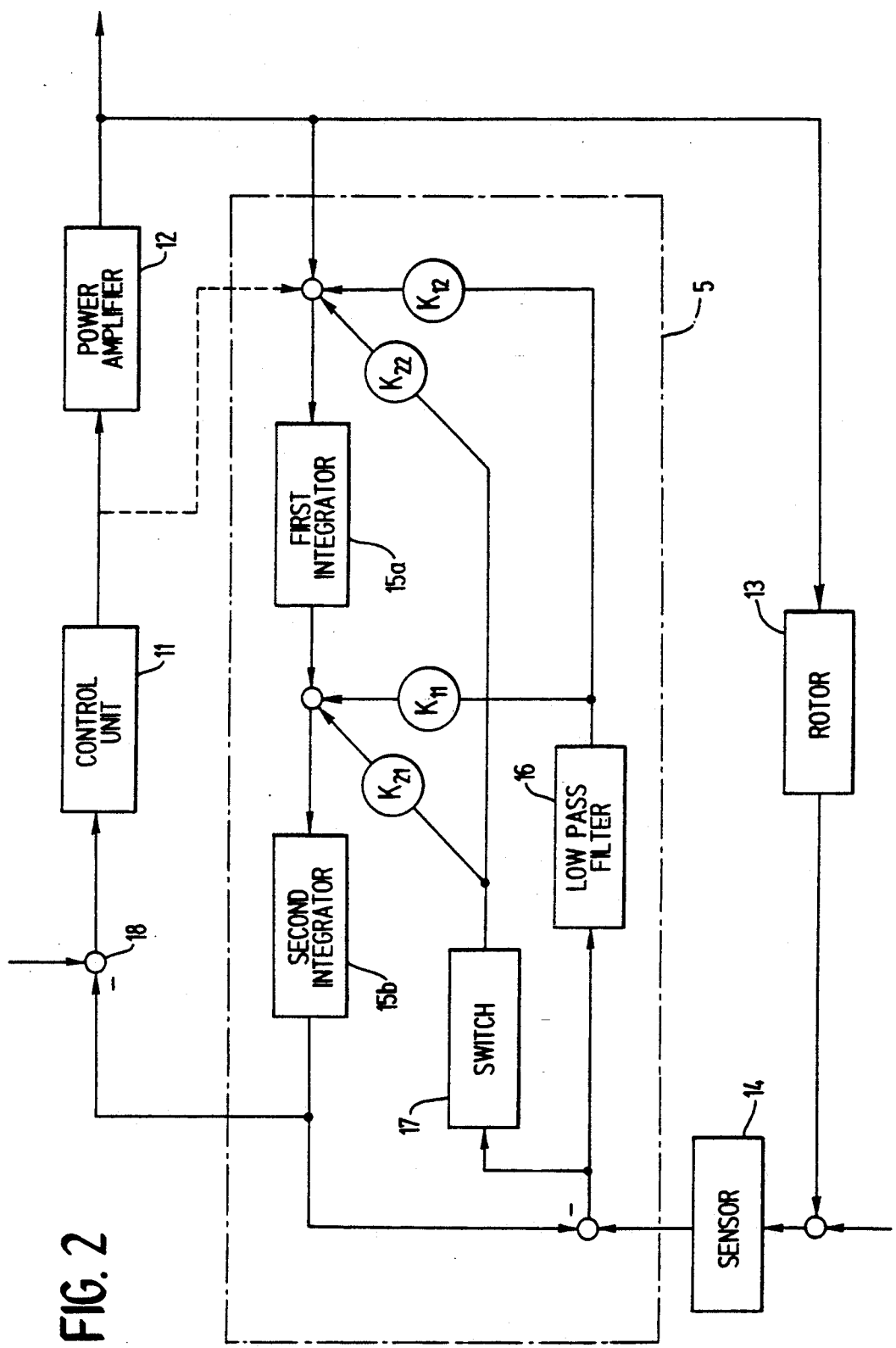
FIG. 2, an exemplary embodiment of a vibration insulation with a dual integrator in a translational bearing control circuit, FIG. 3, a simplified exemplary embodiment of a vibration insulation with a combined dual integrator control unit, also in a translational bearing control circuit, FIG. 4, an exemplary embodiment of a tilting shaft control of a rotor with interference suppression.

The principle of vibration insulation with a double integrator in accordance with the invention will be described by means of FIG. 2. FIG. 2 corresponds to FIG. 1, i.e. the blocks 11 .. 14 correspond to the blocks 1 .. 4, where the gap-force coupling 6 was omitted. The shape enclosed in dash-dotted lines corresponds to the block interference suppression 5 of FIG. 1. The principle consists in the rotor 13 and the sensor 14 being represented by a model consisting of a dual integrator (DI) 15. The DI 15 can be realized either electronically or in accordance with program technology in a computer, the same as the control.

As amplification, the DI 15 has the inverse mass of the body 13 on bearings, multiplied by the sensor amplification. It is supplied with the force which acts on the body 13 on bearings. In practice, a signal proportional to the force would be used instead of the force, for example the control output of the control unit 11, as shown by dashed lines in FIG. 2. In this case the amplification of the DI 15 must be supplemented by the proportionality factor between the signal used and the actual force.

The output signal of the DI 15 corresponds to the position of the body 13 on bearings, but does not contain the interferences. It is therefore used as the actual value for the bearing control, instead of the sensor signal. The stability of the control and the dynamics in respect to set value changes is not changed by this, only the interferences are being suppressed.

Based on inaccuracies in amplification and the temporal behavior, on electronic temperature and offset effect, etc., it is possible that the output signal of the DI 15 differs from the true position after some time. To prevent this, the difference between the position sensor signal and the output signal of the DI 15 is fed back to the integrators 15. In this way these long-term drift effects are compensated by the DI output signal feedback of the sensor signal. Of course, this feedback is designed to be at very low frequencies, so that the interferences do not appear again in this way in the control circuit. First, the difference is sent through a low bandpass filter 16 with a very low threshold frequency before being supplied via small factors K11, K12 to the integrators 15. This corrective feedback is set to be sufficiently slow or of sufficiently low frequency that, although the respective slow drift effects are removed, the interferences of higher frequencies penetrate practically to only a small extent.

Even though the bearing control in respect to changes in the set value continues to be rapid, stator movements caused by external interference effects are a problem, if they narrow the bearing air gap in an impermissible manner. Just as the control unit practically does not "see" stator vibrations and therefore the body 13 on bearings does not feel any interference forces, the stator can also move away almost unnoticed. To prevent this, the above mentioned difference is supplied to a threshold value switch 17 which, when a threshold value has been exceeded, for example half the available bearing air gap, makes the integrators 15 follow the actual position rapidly via a further feedback, without a low bandpass filter and at higher amplification K21, K22. During the action of this rapid feedback the vibration insulation is, of course, only effective to a restricted degree, depending on the amplification of this feedback.

Figure 3:
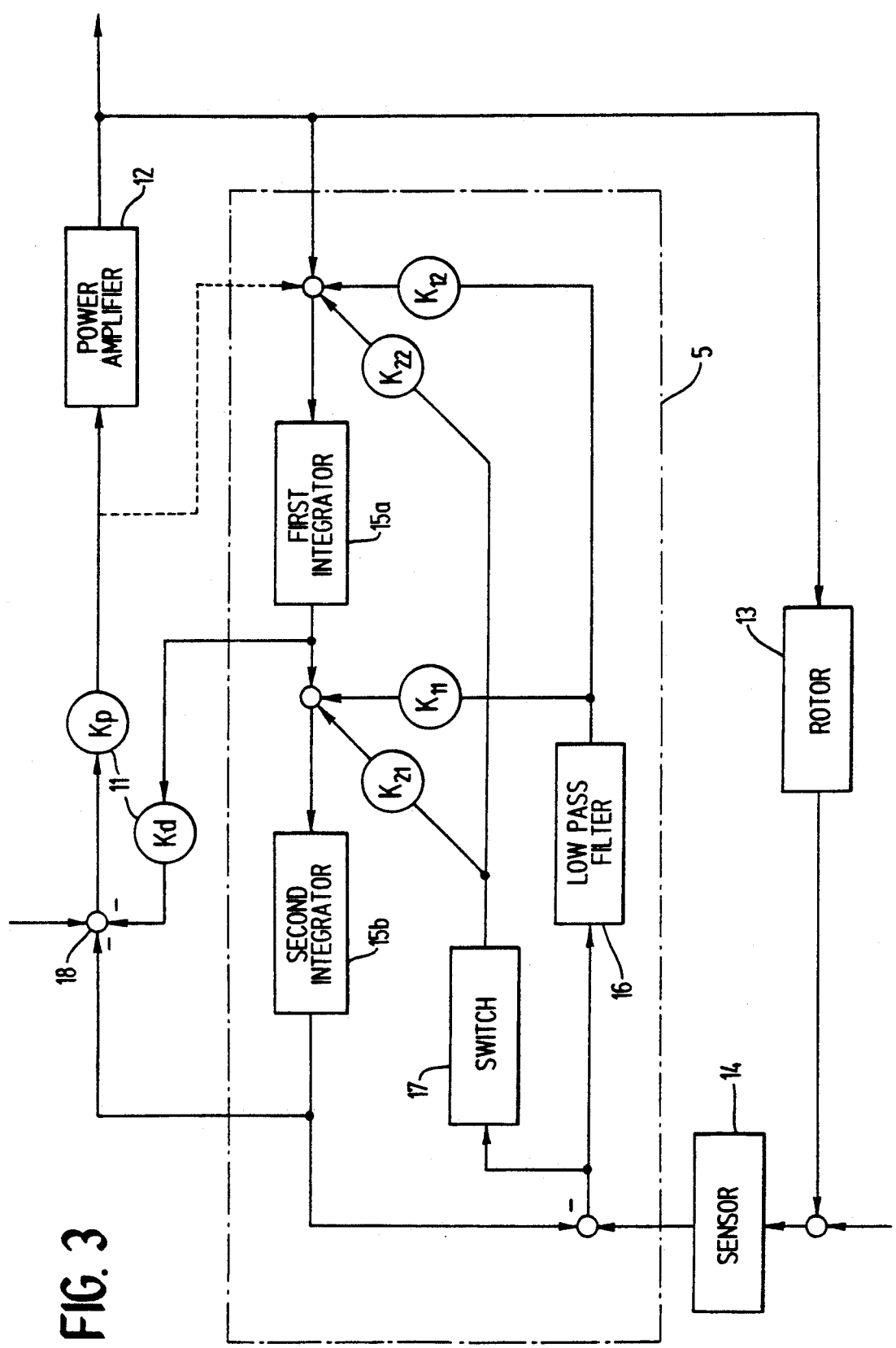

FIG. 3 shows a possible simplification of the control. The control unit (1, 11) of a magnetic bearing control circuit contains in most cases a proportional share Kp and a differentiating share (Td s+1). The latter can be omitted if in addition the output signal of the first integrator 15a is supplied to the set-actual comparison point 18. The associated factor Kd is the product from the amplification of the second integrator 15b and the former differentiating time constant Td. Now, since differentiation in the control is omitted, not only is the system simplified, but the vibration insulation is further improved.

It is possible to employ a variant of the invention in case the force signal is not free of mean values, i.e. when placing a body which is under the influence of gravity, for example, on bearings. Instead of simulating gravity in the DI 15, the force signal is differentiatingly coupled into the DI 15. The first integrator 15a is supplied with a reverse feedback for this purpose, so that in the range of very small frequencies the first integrator 15a becomes a first order low bandpass filter.

Up to now the invention has been described in connection with a translatory bearing control circuit of the magnetic bearing, it is, of course, just as suitable for the rotator circuits. In this case the bearing is replaced by the angle, the force by the torque, the mass by the moment of inertia around the respective axis of rotation, and the imbalance centrifugal movement is a whirling motion.

Figure 4:
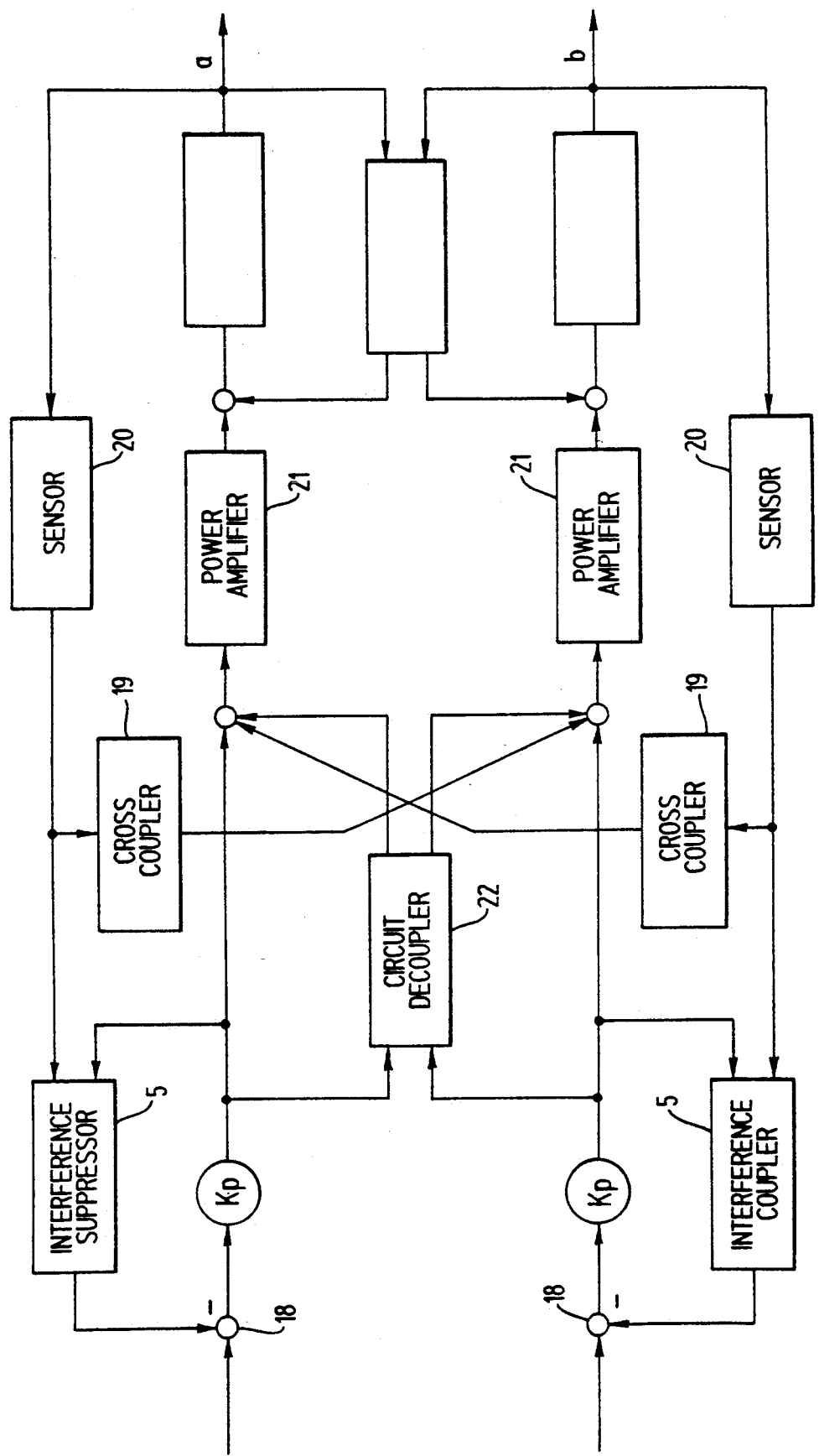

FIG. 4 describes the combined control with vibration insulation for employment of the invention in the two tilting shafts which are perpendicular to the axis of rotation of the rotor. So that the dual integrator principle continues to operate, it is necessary that the coupling of the two tilting shafts $\alpha$, $\beta$ be cancelled by means of a circuit decoupler 22, proposed in German Patent Disclosure DE-A-38 19 205. A nutation oscillation could also be created, which is practically hardly damped by the control because of the vibration insulation. Therefore an additional cross coupling 19 of the tilting shafts $\alpha$, $\beta$ is introduced, which connects each of the outputs of a sensor 20 with the input of the power amplifier 21 of the other shaft. The cross coupling elements 19 a differentiating members with retardation, which have their maximum amplification at the nutation frequency. As a compromise, this amplification is set in such a way that sufficient damping of the nutation oscillations is achieved without coupling too many interferences into the circuits. Box 5 corresponds to the interference suppression already discussed in FIGS. 1 and 2.

The proposed interference insulation can be further improved by means of a force generation principle which does not have a gap-force coupling 6 (FIG. 1). This is the electrodynamic principle. The body 3, 13 (FIG. 3, 13) on bearings has one or a plurality of fields generated by permanent magnets, into which iron-free coils extend on the stator side and are supplied by current-impressing power amplifiers. In this case, in addition to linearity, bidirectionality and very small time constants, this principle has the particular advantage that the force generated only depends on the current, and not (given a homogeneous field) on the movements of the body on bearings. Thus, imbalance movements are not translated into imbalance vibrations, i.e. the rotor can rotate around its center of gravity or its axis of inertia without the resultant centrifugal and whirling movements of the surface generating corresponding vibrations. The same is true for movements of the stator which do not affect the rotor.

A particularly interesting possibility of employment is a flywheel on magnetic bearings for stabilizing a satellite, which is equipped with the interference suppression means described. This can be used in vibration-sensitive satellites, for example space telescopes, where it can be employed for bearing control in a precision viewing range with simultaneous lack of vibration.

I claim:
1. In a device for weakening interference forces created during seating of a body on magnetic bearings, the body being movable along at least one translational axis, which device includes a magnetic position control circuit connected between a sensor which provides a signal representing the position of the body relative to the bearings and a control unit having an input and an output for providing a signal to adjust the position of the body relative to the bearings, the control circuit having means defining two integrators, the improvement wherein:

said means defining two integrators comprise a first integrator and a second integrator each having a signal input and a signal output, said signal output of said first integrator being connected to said signal input of said second integrator so that said first and second integrators constitute a double integration unit, said signal input of said first integrator is connected to receive a signal having a value at least approximately proportional to a force capable of stabilizing the body relative to the bearings along at least one translational axis, and said double integration unit is operative for providing an output signal constituting an actual position value control signal from said control circuit; and said control circuit further comprises means including a low-pass filter and attenuation members for applying to the inputs of both of said integrators two signals each having a value which is a function of the difference in value between the output signal provided by said double integration unit and the signal provided by said sensor.

2. A device in accordance with claim 1, wherein said double integration unit has an amplification factor which is: directly proportional to a ratio of the actual force acting on the body to the signal supplied to said double integration unit; directly proportional to the amplification factor of said sensor; and inversely proportional to the mass of the body.

3. A device in accordance with claim 2, further comprising signal transfer means connected for transferring to each said integrator input a signal proportional to the difference between the output signal of said double integration circuit and the position signal only when said difference exceeds a given threshold value, wherein each integrator input receives in addition to the signal received at the same input from said filter a signal from said signal transfer means which has a greater magnitude than the signal received at the same input from said filter.

4. A device in accordance with claim 3, further comprising means connecting the signal output of said first integrator to said control unit for supplying a signal from the signal output of said first integrator to the input of said control unit with a selected amplification, and wherein said control unit is a proportional control unit which produces an output signal that is linearly proportional to the signal at its input.

5. A device in accordance with claim 4, further comprising a differentiation member connected for supplying the signal to the input of the double integrator unit, and a proportional inverse feedback for said first integrator.

6. A device in accordance with claim 5, further comprising means for electrodynamically generating the force for stabilizing the body.

7. A device in accordance with claim 1, forming a component of a flywheel on magnetic bearings for performing angular bearing control in a satellite.

8. In a device for weakening interference forces created during seating of a body on magnetic bearings, which body is rotatable on the bearings about an axis of rotation, is capable of tilting about two tilting axes which are perpendicular to the axis of rotation and can be stabilized about one of the tilting axes by a torque, the device including a magnetic position control circuit connected between a sensor which provides a signal representing the position of the body relative to the bearings and a control unit having an input and an output for providing a signal to adjust the position of the body relative to the bearings, the control circuit having means defining two integrators, the improvement wherein:

said means defining two integrators comprise a first integrator and a second integrator each having a signal input and a signal output, said signal output of said first integrator is connected to said signal input of said second integrator so that said first and second integrators constitute a double integration unit, said signal input of said first integrator is connected to receive a signal having a value at least proportional to the torque which can stabilize the body about the one tilting axis, and said double integration unit is operative for providing an output signal constituting an actual position value control signal from said control circuit; and said control circuit further comprises means including a low-pass filter and attenuation members for applying to the inputs of both of said integrators two signals each having a value which is a function of the difference in value between the output signal provided by said double integration unit and the signal provided by said sensor.

9. A device in accordance with claim 8, wherein said double integration unit has an amplification factor, which is: directly proportional to a ratio of the actual torque acting on the body to the signal supplied to said double integration unit; directly proportional to the amplification factor of said sensor; and inversely proportional to the tilt-inertia moment of the body.

10. A device in accordance with claim 9, further comprising signal transfer means connected for transferring to each said integrator input a signal proportional to the difference between the output signal of said double integration unit and the position signal only when said difference exceeds a given threshold value, wherein each integrator input receives in addition to the signal received at the same input from said filter a signal from said signal transfer means which has a greater magnitude than the signal received at the same input from said filter.

11. A device in accordance with claim 10, further comprising means connecting the signal output of said first integrator to said control unit for supplying a signal from the signal output of said first integrator to the input of said control unit with a selected amplification, and wherein said control unit is a proportional control unit which produces an output signal that is linearly proportional to the signal at its input.

12. A device in accordance with claim 11, further comprising a differentiation member connected for supplying the signal to the input of the double integrator unit, and a proportional inverse feedback for said first integrator.

13. A device in accordance with claim 12, further comprising means for electrodynamically generating the torque for stabilizing the body.

14. A system comprising: two devices each as defined in claim 8 and each connected for controlling a body which is rotatable about an axis of rotation and has two tilting axes which extend at an angle to one another and are perpendicular to the axis of rotation, wherein the signal provided by said control unit of each said device produces a torque to stabilize the body about a respective one of the tilting axes; a decoupling device connected for decoupling said two devices; and an integral mutual forward coupling linking together the output signals of said control units of said two devices and having a time constant which is kept inversely proportional to the rate of rotation of the body.

15. A system in accordance with claim 8, wherein said control unit of each said device has a power amplifier having an input and an output which provides the signal to adjust the position of the body, and said system further comprises a cross coupling composed of two differentiation and delay members each connected for conducting the signal provided by the sensor associated with one said device to said power amplifier input of the other said device for damping nutation oscillations of the body.

16. A device in accordance with claim 8, forming a component of a flywheel on magnetic bearings for performing angular bearing control in a satellite.

* * * * *